(12) United States Patent
Laor et al.

(10) Patent No.: US 8,631,253 B2
(45) Date of Patent: Jan. 14, 2014

(54) MANAGER AND HOST-BASED INTEGRATED POWER SAVING POLICY IN VIRTUALIZATION SYSTEMS

(75) Inventors: Dor Laor, Tel Aviv (IL); Itamar Heim, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 739 days.

(21) Appl. No.: 12/858,035

(22) Filed: Aug. 17, 2010

(65) Prior Publication Data

US 2012/0047383 A1 Feb. 23, 2012

(51) Int. Cl.
*G06F 1/00* (2006.01)
*G06F 9/46* (2006.01)

(52) U.S. Cl.
USPC ............. 713/300; 713/324; 710/29; 718/105

(58) Field of Classification Search
USPC ............. 713/300, 320, 324; 710/29; 718/105
See application file for complete search history.

(56) References Cited

U.S. PATENT DOCUMENTS

| | | | | |
|---|---|---|---|---|
| 7,788,670 | B2 * | 8/2010 | Bodas et al. | 718/105 |
| 8,010,822 | B2 * | 8/2011 | Marshall et al. | 713/324 |
| 8,250,395 | B2 * | 8/2012 | Carter et al. | 713/322 |
| 8,251,852 | B2 * | 8/2012 | Bohnstedt | 475/159 |
| 8,296,773 | B2 * | 10/2012 | Bose et al. | 718/105 |
| 8,381,002 | B2 * | 2/2013 | Nayar et al. | 713/320 |
| 8,381,006 | B2 * | 2/2013 | Flachs et al. | 713/324 |
| 2010/0037038 | A1 * | 2/2010 | Bieswanger et al. | 712/220 |
| 2011/0072293 | A1 * | 3/2011 | Mazzaferri et al. | 713/340 |
| 2011/0208875 | A1 * | 8/2011 | Hasson et al. | 709/238 |
| 2012/0036515 | A1 * | 2/2012 | Heim | 718/105 |

* cited by examiner

*Primary Examiner* — Brian Misiura
(74) *Attorney, Agent, or Firm* — Lowenstein Sandler LLP

(57) ABSTRACT

A mechanism for a manager and host-based integrated power saving policy in virtualization systems is disclosed. A method of the invention includes receiving configuration and power information of a host machine from a management agent on the host machine, performing a macro-level power saving scheduling algorithm that takes into consideration the received configuration and power information of the host machine, and requesting that the host machine alter a number of active running CPU cores as part of the macro-level power saving scheduling algorithm.

19 Claims, 4 Drawing Sheets

MANAGER AND HOST-BASED INTEGRATED POWER SAVING POLICY IN VIRTUALIZATION SYSTEMS

TECHNICAL FIELD

The embodiments of the invention relate generally to virtualization systems and, more specifically, relate to a mechanism for a manager and host-based integrated power saving policy in virtualization systems.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a virtual machine monitor (VMM) manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The VMM virtualizes the underlying hardware of the host machine or emulates hardware devices, making the use of the VM transparent to the guest operating system or the remote client that uses the VM.

One goal of the above-described virtualization systems is to reduce power consumption in the system with a power saving strategy. Currently, there are two mechanisms to control power consumption in a virtualization system: (1) a macro-level power saving policy implemented by a central manager such as a host controller, and (2) a micro-level power saving policy implemented by each host machine. The macro-level power saving policy includes a central manager trying to consolidate workload on a small number of host machines, so that other host machines can be shutdown. One example of a macro-level power saving scheduling policy is to reduce power utilization by consolidating the workload on a small number of host machines and shutting down host machines that are not used in order to reduce overall power consumption. The central manager is usually slower in making changes (e.g., minutes), as it responds to trends.

The micro-level power saving policy is implemented at a local host machine scheduler, which shuts down unused local resources (e.g., CPU cores) in order to save power one each individual host machine. The local manager is usually faster in responding to changes (e.g., seconds and less) than a central manager of the macro-level power saving policy.

However, there can be more to a power saving policy than shutting down a single host machine. Some power saving policies include the ability to shut down individual components of a host machine, rather than the host machine itself. For example, a power saving policy can shut down CPU cores, network interface cards (NICs), and so on. This is where a micro-level power saving policy comes in, which can throttle power within a single host machine by shutting down individual components within the machine. Unfortunately, there is no collaboration between macro-level power saving policies and micro-level power saving policies. This can lead to inefficiencies in overall power consumption in a virtualization system.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
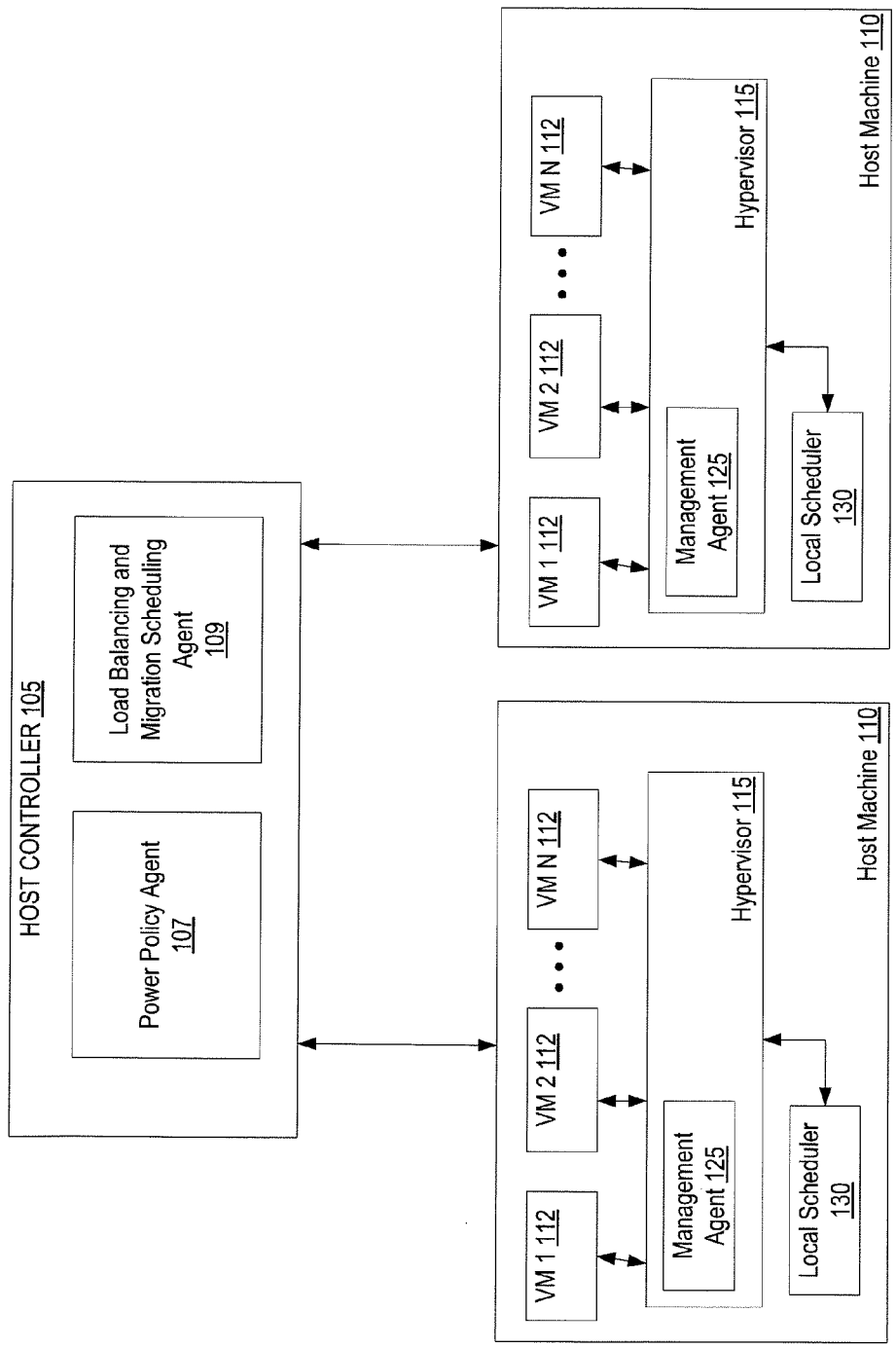
FIG. 1 is a block diagram of an exemplary virtualization architecture in which embodiments of the present invention may operate.

Embodiments of the invention provide a mechanism for a manager and host-based integrated power saving policy in virtualization systems. A method of embodiments of the invention includes receiving configuration and power information of a host machine from a management agent on the host machine, performing a macro-level power saving scheduling algorithm that takes into consideration the received configuration and power information of the host machine, and requesting that the host machine alter a number of active running CPU cores as part of the macro-level power saving scheduling algorithm.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for a manager and host-based integrated power saving policy in virtualization systems. The integrated power saving policy of embodiments of the invention collaborate between (1) a system-wide power saving policy implemented at a host controller machine, and (2) a per-host machine locally implemented power saving policy. The host controller machine is aware of each individual host machine's power saving policy and takes this information into consideration when implementing a system-wide power saving policy.

FIG. 1 illustrates an exemplary virtualization architecture 100 in which embodiments of the present invention may operate. The virtualization architecture 100 may include one or more host machines 110 to run one or more virtual machines (VMs) 112. Each VM 112 runs a guest operating system (OS) that may be different from one another. The guest OS may include Microsoft Windows, Linux, Solaris, Mac OS, etc. The host machine 110 may include a hypervisor 115 that emulates the underlying hardware platform for the VMs 112. The hypervisor 115 may also be known as a virtual machine monitor (VMM), a kernel-based hypervisor or a host operating system.

In one embodiment, each VM 112 may be accessed by one or more of the clients over a network (not shown). The network may be a private network (e.g., a local area network (LAN), wide area network (WAN), intranet, etc.) or a public network (e.g., the Internet). In some embodiments, the clients may be hosted directly by the host machine 110 as a local client. In one scenario, the VM 112 provides a virtual desktop for the client.

As illustrated, the host 110 may be coupled to a host controller 105 (via a network or directly). In some embodiments, the host controller 105 may reside on a designated computer system (e.g., a server computer, a desktop computer, etc.) or be part of the host machine 110 or another machine. The VMs 112 can be managed by the host controller 105, which may add a VM, delete a VM, balance the load on the server cluster, provide directory service to the VMs 112, and perform other management functions.

The host controller 105 includes a power policy agent 107 that implements the integrated power saving policy of embodiments of the invention. Power policy agent 107 of host controller 105 implements a macro-level power saving scheduling policy in conjunction with load balancing and migration agent 109. Additionally, in embodiments of the invention, power policy agent 107 is aware of a host machine 110 micro-level power saving scheduling policy and utilizes this awareness to aid in the host controller's 105 own macro-level power saving policy decisions.

With respect to the local host machine 110 micro-level power saving scheduling policy, this micro-level power saving policy operates so that each host machine 110 may change any of its cores' power states. In one case, a core's power state is altered by reducing the core's speed or shutting the core down when load on the host machine 110 is less than X % for over Y milliseconds. In another case, a core's power state is changed by raising its speed or activating the core when load on the host machine 110 is more than X% for over Y milliseconds. For both of the above calculations, the X % is based on total CPU utilization divided by the number of active cores (i.e., average distributed CPU consumption), then dividing this result by 100 and dividing again by the number of total cores on the host machine (i.e., portion in percentage of CPU affected by a single core). In addition, for both of the above calculations, a power state change that affects a speed change is based on the ratio between the pre and post speeds, multiplied by the core CPU percentage portion. In addition, the local scheduler may use a notation provided by the host controller 105 on lower priority tasks and pin them to cores with lower speeds.

The host controller 105 macro-level power saving scheduling policy takes several approaches to making decisions on consolidating workload to reduce power saving policy. Each of these approaches is augmented in embodiments of the invention with the knowledge of the host machine's 110 micro-level power saving policy. Specifically, in embodiments of the invention, the power policy agent 107 communicates with a management agent 125 of hypervisor 115 on each host machine 110 in order to determine configuration and power policy information for each host machine 110. This configuration and power policy information includes the total number of CPU cores as well as the number of active CPU cores on any given host machine 110 that the host controller 105 manages. Furthermore, the management agent 125 may provide information on the actual power consumption of each core on the host machine 110. In some embodiments, this configuration and power policy information is collected every several seconds from the management agent 125, which monitors and collects this information by communication with a lower-level power saving scheduling daemon in the host machine 110.

When the host controller 105 is performing any load balancing scheduling checks, the CPU consumption for a service level agreement (SLA) on 'max' (distribute to other hosts) and 'min' (consolidate to other hosts) is based on the total number of cores in the host machine 110, rather than the active number of cores. For example, assume a host machine 110 is utilizing 80% load overall. However, the host machine 110 is running the 80% load only on 2 running cores, but actually the host machine 110 has 10 more cores that could be activated. In this situation, embodiments of the invention will allow the host controller 105 to take the information on the total number of cores in the host machine 110 into account in order to avoid activating another host machine 110, when it can just activate more cores on the same host machine 110 that is already running.

Similarly, when the host controller 105 is performing any host selection comparison algorithms, the host controller 105 may take into account the granularity of activating another core on the host machine 110, giving a higher score to host machines 110 where an expected load (based on history) will require the least amount of cores to be activated (expected).

In some embodiments, the host controller 105 may take into account the power consumption per core on the host machine 110 (different hosts have different power consumptions per core). In one embodiment, the host controller 105 may request the local scheduler 130 of a host machine 110 to activate more cores if it deems the SLA policy is not met before migrating load to another host machine 110. The host controller 105 may also request the local scheduler 130 of a host machine 110 to shut down more cores if it deems the power saving policy goals are not met. This could be tied, for example, to different costs associates with electricity over different hours of the day. This will be done if the host controller 105 could not suspend any more tasks, but can allow them to run in a lower priority state and take longer.

Figure 2:
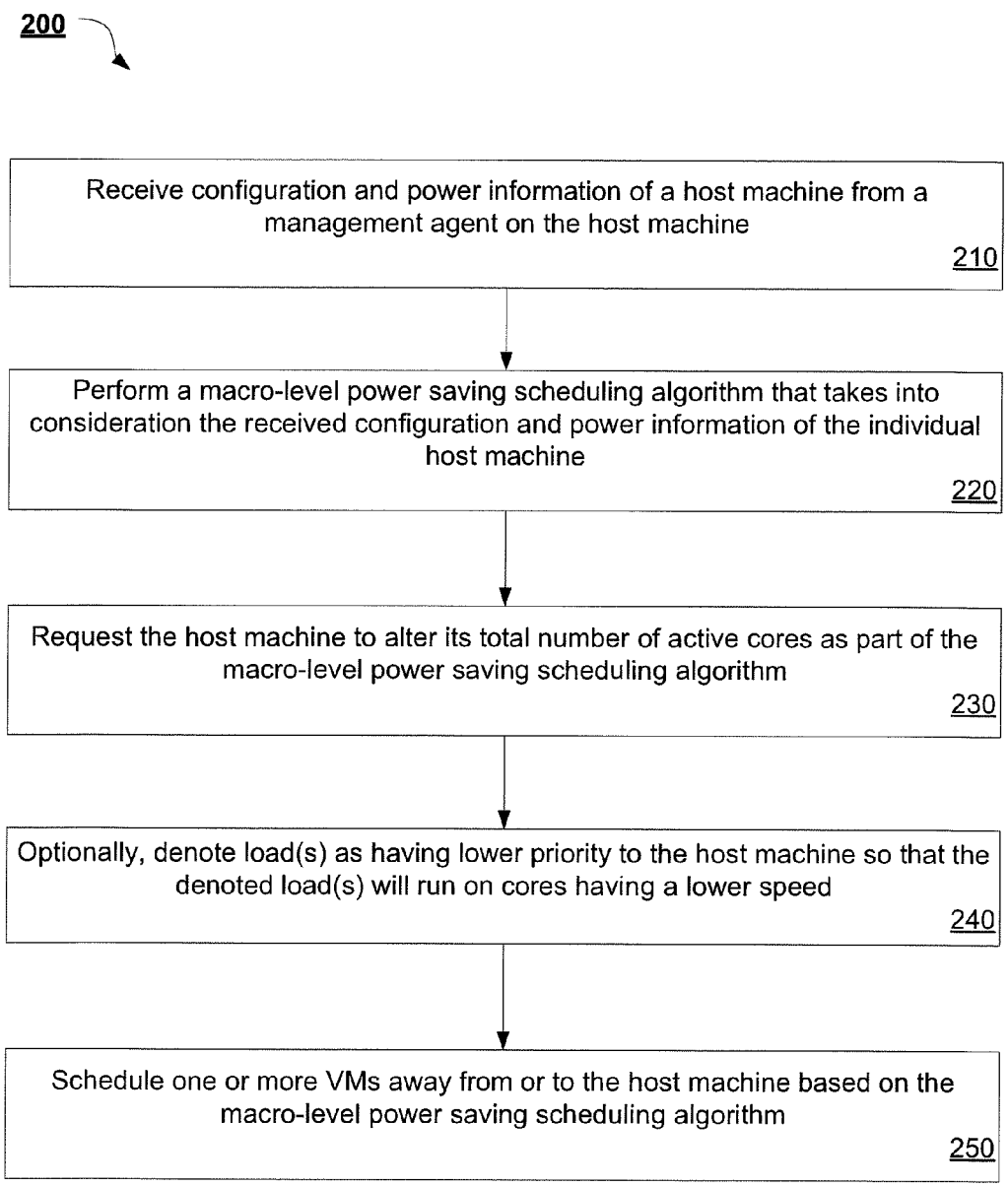
FIG. 2 is a flow diagram illustrating a method performed by a host controller for manager and host-based integrated power saving policy in virtualization systems according to an embodiment of the invention.

FIG. 2 is a flow diagram illustrating a method 200 performed by a host controller for manager and host-based integrated power saving policy in virtualization systems according to an embodiment of the invention. Method 200 may be performed by processing logic that may comprise hardware (e.g., circuitry, dedicated logic, programmable logic, microcode, etc.), software (such as instructions run on a processing device), or a combination thereof. In one embodiment, method 200 is performed by host controller 105, and, more specifically, the power policy agent 107 of host controller 105 described with respect to FIG. 1.

Method 200 begins at block 210 where configuration and power information related to a host machine are received from a management agent located on that host machine. In one embodiment, the configuration information includes the total number of cores available on the host machine as well as the number of active running cores on the host machine. The power information may include the actual power consumption of each core on the host machine.

Then, at block 220, a macro-level power saving scheduling algorithm is performed as part of load balancing or a host selection process. The macro-level power saving scheduling algorithm takes into account the received configuration and power information of the individual host machine. For instance, the macro-level power saving scheduling algorithm will look at the total number of cores available on the host machine, rather than just the number of active running cores, when determine how to distribute load (i.e., VMs) or schedule load between host machines. In one embodiment, the macro-level scheduler looks at the total cores on the host machine, as it schedules based on the potential use of all cores on the host machine. The micro-level scheduler looks at the active number of cores, and if the average CPU utilization is above a certain Service Level Agreement (SLA), it will activate another core (as long as the number of active cores is less than or equal to the number of total cores, of course).

At block 230, as part of the macro-level power saving scheduling algorithm, the host controller requests the host machine to alter its total number of active running cores. In one embodiment, this may mean requesting the host machine to active more cores in order to distribute additional load across the host machine rather than activating another host machine. In other embodiments, this may mean requesting the host machine to shut down cores in order to consolidate load, and reduce power consumption, on the host machine.

At block 240, the host controller may also optionally denote to the host machine loads that have a lower priority so that the denoted loads may run on cores on the host machine that have a lower speed. In this case, the host controller relied on the power information received at block 210 to make this determination. Lastly, at block 250, the host controller schedules one or more VMs away from or to the host machine based on the results of the macro-level power saving scheduling algorithm.

Figure 3:
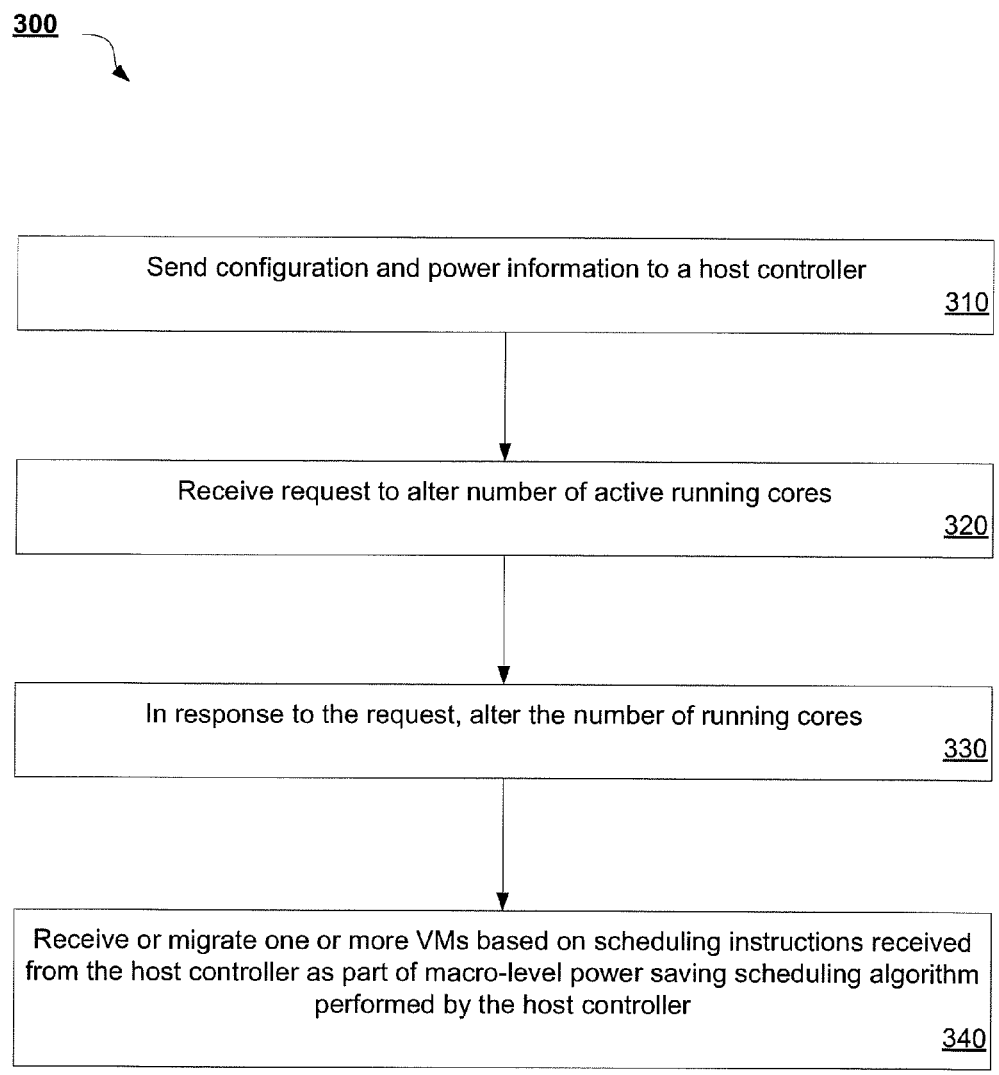
FIG. 3 is a flow diagram illustrating a method performed by a host machine for manager and host-based integrated power saving policy in virtualization systems according to an embodiment of the invention.

FIG. 3 is a flow diagram illustrating a method 300 performed by a host machine for manager and host-based integrated power saving policy in virtualization systems according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by host machine 110 of FIG. 1.

Method 300 begins at block 310 where configuration and power information are sent to a host controller. In one embodiment, this configuration and power information may be collected by a power saving scheduling daemon and provided to a management agent of a hypervisor in the host machine. The management agent, in turn, sends this information to a host controller that manages the host machine. At block 320, a request to alter the number of active running cores in the host machine is received. In one embodiment, the request may be to active one or more cores in the host machine. In another embodiment, the request may be to shut down one or more cores in the host machine.

Subsequently, at block 330, the number of running cores on the host machine is altered according to the request. Lastly, at block 340, scheduling instructions are received at the host machine to at least one of receive or migration one or more VMs at the host machine as part of a macro-level power saving scheduling algorithm performed by the host controller.

Figure 4:
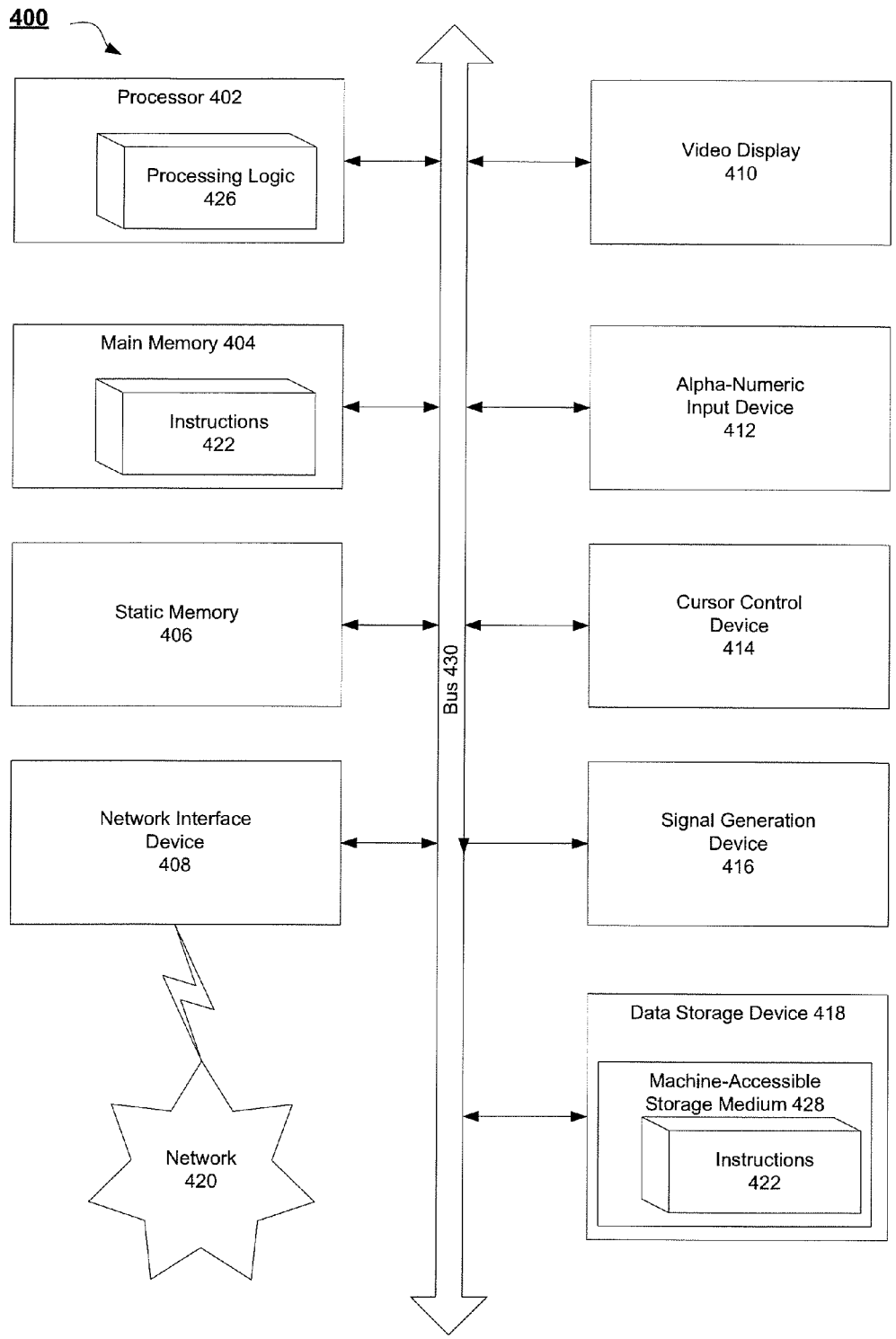
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. For example, software 322 may store instructions to perform a manager and host-based integrated power saving policy in virtualization systems by host controller 105 described with respect to FIG. 1. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to stored instructions to perform manager and host-based integrated power saving policy in virtualization systems of methods 200 and 300 described with respect to FIGS. 2 and 3, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
   receiving, by a host controller machine, configuration and power information of a host machine from a management agent on the host machine, the configuration information comprising a total number of CPU cores on the host machine and a number of active running CPU cores on the host machine;
   performing, by the host controller machine, a macro-level power saving scheduling algorithm that takes into consideration the received configuration and power information of the host machine; and
   requesting, by the host controller machine, that the host machine alter the number of active running CPU cores as part of the macro-level power saving scheduling algorithm.

2. The method of claim 1, wherein taking into consideration the received configuration and power information of the host machine further comprises considering the total number of CPU cores when at least one of load balancing the host machine or considering the host machine as part of a host selection algorithm.

3. The method of claim 2, further comprising denoting one or more loads as having a lower priority to the host machine so that the denoted one or more loads run on CPU cores having a lower power consumption.

4. The method of claim 1, wherein the power information comprises an actual power consumption of each CPU core on the host machine.

5. The method of claim 1, wherein the requesting that the host machine alter a number of active running CPU cores further comprises requesting the host machine to activate one or more of its inactive CPU cores.

6. The method of claim 1, wherein the requesting that the host machine alter a number of active running CPU cores further comprises requesting the host machine to shut down one or more of its active running CPU cores.

7. The method of claim 1, further comprising scheduling one or more virtual machines (VMs) to the host machine based on the macro-level power saving scheduling algorithm.

8. A system, comprising:
   a memory;
   a processing device communicably coupled to the memory; and
   a power policy agent executable from the memory by the processing device, the power policy agent to:
     receive configuration and power information of a host machine from a management agent on the host machine, the configuration information comprising a total number of CPU cores on the host machine and a number of active running CPU cores on the host machine;

perform a macro-level power saving scheduling algorithm that takes into consideration the received configuration and power information of the host machine; and request that the host machine alter a number of active running CPU cores as part of the macro-level power saving scheduling algorithm.

9. The system of claim 8, wherein taking into consideration the received configuration and power information of the host machine further comprises considering the total number of CPU cores when at least one of load balancing the host machine or considering the host machine as part of a host selection algorithm.

10. The system of claim 9, wherein the power policy agent further to denote one or more loads as having a lower priority to the host machine so that the denoted one or more loads run on CPU cores having a lower power consumption.

11. The system of claim 8, wherein the power information comprises an actual power consumption of each CPU core on the host machine.

12. The system of claim 8, wherein the requesting that the host machine alter a number of active running CPU cores further comprises at least one of requesting the host machine to activate one or more of its inactive CPU cores or requesting the host machine to shut down one or more of its active running CPU cores.

13. The system of claim 8, further comprising scheduling one or more virtual machines (VMs) to the host machine based on the macro-level power saving scheduling algorithm.

14. A non-transitory machine-readable storage medium including data that, when accessed by a processing device, cause the processing device to perform operations comprising:

receiving, by the processing device, configuration and power information of a host machine comprising the processing device from a management agent on the host machine, the configuration information comprising a total number of CPU cores on the host machine and a number of active running CPU cores on the host machine;

performing a macro-level power saving scheduling algorithm that takes into consideration the received configuration and power information of the host machine; and requesting that the host machine alter a number of active running CPU cores as part of the macro-level power saving scheduling algorithm.

15. The non-transitory machine-readable storage medium of claim 14, wherein taking into consideration the received configuration and power information of the host machine further comprises considering the total number of CPU cores when at least one of load balancing the host machine or considering the host machine as part of a host selection algorithm.

16. The non-transitory machine-readable storage medium of claim 15, wherein the operations further comprise denoting one or more loads as having a lower priority to the host machine so that the denoted one or more loads run on CPU cores having a lower power consumption.

17. The non-transitory machine-readable storage medium of claim 14, wherein the requesting that the host machine alter a number of active running CPU cores further comprises at least one of requesting the host machine to activate one or more of its inactive CPU cores or requesting the host machine to shut down one or more of its active running CPU cores.

18. The non-transitory machine-readable storage medium of claim 14, wherein the power information comprises an actual power consumption of each CPU core on the host machine.

19. The non-transitory machine-readable storage medium of claim 14, wherein the operations further comprise scheduling one or more virtual machines (VMs) to the host machine based on the macro-level power saving scheduling algorithm.

* * * * *